United States Patent [19]

Choi et al.

[11] Patent Number: 5,708,641
[45] Date of Patent: Jan. 13, 1998

[54] MULTIPLE FOCUS OPTICAL PICKUP SYSTEM

[75] Inventors: Yang-Oh Choi; Ki-Tae Kim, both of Seoul, Rep. of Korea

[73] Assignee: Daewoo Electronics Co. Ltd., Seoul, Rep. of Korea

[21] Appl. No.: 706,305

[22] Filed: Aug. 30, 1996

[30] Foreign Application Priority Data

Aug. 31, 1995 [KR] Rep. of Korea ............... 95-28010

[51] Int. Cl.$^6$ ............................................. G11B 7/12
[52] U.S. Cl. ............................................. 369/112; 369/103
[58] Field of Search .............................. 369/112, 103, 369/110, 109, 100, 44.11, 44.12, 44.14

[56] References Cited

U.S. PATENT DOCUMENTS

| | | |
|---|---|---|
| 4,210,391 | 7/1980 | Cohen. |
| 4,936,666 | 6/1990 | Futhey. |
| 5,132,843 | 7/1992 | Aoyama et al.. |
| 5,231,620 | 7/1993 | Ohuchida. |
| 5,446,565 | 8/1995 | Komma et al. .............. 369/103 X |
| 5,583,843 | 12/1996 | Horinouchi .............. 369/103 |

FOREIGN PATENT DOCUMENTS

| | | |
|---|---|---|
| 0610055 | 8/1994 | European Pat. Off.. |
| 1300031 | 12/1972 | United Kingdom. |

*Primary Examiner*—Muhammad N. Edun
*Attorney, Agent, or Firm*—Anderson, Kill & Olick, P.C.

[57] ABSTRACT

An optical pickup system for reproducing information signals stored on a first and a second optical disks loaded on a disk tray is described wherein each of the optical disks has a different thickness. The optical system includes a light source for generating a parallel light beam and an optical device provided with a first and a second part, wherein a portion of parallel light beam impinging onto the first part is focused onto the first optical disk, and the remaining portion of the parallel light beam impinging onto the second part is focused onto the second optical disk, thereby allowing the optical pickup system to read the information signals off the respective optical disk.

22 Claims, 3 Drawing Sheets

MULTIPLE FOCUS OPTICAL PICKUP SYSTEM

FIELD OF THE INVENTION

The present invention relates to an optical pickup system; and, more particularly, to an improved optical pickup system capable of reading both thin and thick optical disks.

DESCRIPTION OF THE PRIOR ART

As is well known, a short wavelength light source and a large numerical aperture (NA) are important optical factors in optical pickup heads for realizing high density optical storage. However, a large NA lens, e.g., 0.6, is preferably used with a thin optical disk of thickness of, e.g., 0.6 mm, and if an optical head for reading the thin optical disk is used to read a conventional 1.2 mm disk, the spherical aberration caused by the disk thickness difference must be corrected.

A dual focus optical head with a holographic optical element (HOE) has been introduced to solve the problem.

In FIG. 1, there is shown the dual focus optical head 100 for reproducing information signals stored on a thin and a thick optical disks loaded on a disk tray alternately, wherein each of the optical disks has a corresponding recording surface, which is described in Kanda and Hayashi, "Dual Focus Optical Head for 0.6 mm and 1.2 mm Disks", *SPIE Vol.* 2338 *Optical Data Storage* (1994)/283. The dual focus optical head 100 includes: a light source 126 for generating a light beam, a beam splitter 106, a collimate lens 108, a HOE 110, an objective lens 112, a cylindrical lens 104 and a detector 102 provided with four photoelectric cells, wherein the HOE 110 is designed as a concave lens in such a way that the focal length of a +1st order diffracted light beam 128 is farther from the objective lens than that of a 0th order diffracted light beam 124.

In the optical head 100, when a thin optical disk 116 is loaded on the disk tray, the 0th order diffracted light beam 124 transmitted from the HOE 110 is utilized for reproducing the information signal off a recording surface 118 of the thin optical disk 116. In this case, the light beam emitted from the light source 126, e.g., a laser diode, enters the HOE 110 via the beam splitter 106 for passing partially through the surface incorporated therein and the collimate lens 108 for making the light beam from the beam splitter 106 to be parallel. In such a case, the HOE 110 simply plays the role of a parallel plate for the 0th order diffracted light beam 124 of the parallel light beam. The 0th order diffracted light beam 124 is focused onto the recording surface 118 of the thin optical disk 116 by the objective lens 114. When the 0th order diffracted light beam 124 is returned from the thin optical disk 116 to the HOE 110 via the objective lens 114, the HOE 110 also plays the role of a parallel plate. The 0th order diffracted light beam 124, after passing through the collimate lens 108 and the beam splitter 106, becomes astigmatic by passing through the cylindrical lens 104, allowing the detector 102 to read the information signal off the recording surface 118 of the thin optical disk 116.

Meanwhile, in order to reproduce the information signal off a recording surface 120 of a thick optical disk 122, the +1st order diffracted light beam 128 transmitted from the HOE 110 is used. It should be noted that the functions and structures of the optical components except the HOE 110 for the +1st order diffracted light beam 128 in the optical head 100 be similar to those for the 0th order diffracted light beam 124. In this case, the HOE 110 functions as a lens for focusing the +1st order diffracted light beam 128 onto the recording surface 120 of the thick optical disk 122 in combination with the objective lens 112. Therefore, the optical head 100 for use with the thin optical disk 116 is capable of reproducing the information signal off the recording surface 120 of the thick optical disk 122.

There is a number of problems associated with the above-described optical head 100, however. First of all, the HOE 110 must be combined with the objective lens 112 for serving as a lens, thereby making the optical head 100 bulky and structurally complicated.

Another problem present in the prior optical head is that it requires a difficult manufacturing process of the HOE 110, and such a HOE 110 is usually expensive.

SUMMARY OF THE INVENTION

It is, therefore, a primary object of the present invention to provide a novel optical device capable of dividing a parallel light beam into a number of portions and focusing each portion onto the same number of focal points, respectively.

It is another object of the present invention to provide an improved optical pickup system capable of reading a plurality of optical disks having some or all different thicknesses.

In accordance with one aspect of the present invention, there is provided an optical device for use in an optical pickup system, the device comprising: a base, made of a refractive material, having a top and a bottom surfaces parallel to each other, wherein the top surface is divided into N number of annular regions; and N sets of M triangular rings, each of the N sets of the M triangular rings being placed on top of each of the annular regions, each of the triangular rings in each of the sets being made of the refractive material and including an annular base surface having a width $R_M$, and an annular normal surface having a height $H_M$, the annular base surface being perpendicular to the annular normal surface, wherein each of the N sets of triangular rings is made to function as a lens, each of the N sets being made to have a different focal length f by controlling the height $H_M$ and the width $R_M$ in each of the triangular rings in each of the sets, and M and N are natural numbers.

In accordance with another aspect of the present invention, there is provided an optical pickup system for reproducing information signals stored on a number of optical disks loaded on a disk tray, wherein each of the optical disks has a respective recording surface, the system comprising: a light source for generating a parallel light beam; and an optical device provided with a plurality of parts, wherein each of the parts having a different focal length is capable of dividing the parallel light beam into the same number of portions as that of the optical disks and focusing each portion of the parallel light beams onto the recording surface of a corresponding optical disk, respectively, to thereby allow the optical pickup system to read the information signals off the recording surface of the corresponding optical disk.

BRIEF DESCRIPTION OF THE DRAWINGS

The present invention together with the above and other objects and advantages will become apparent from the following description of preferred embodiments, when given in conjunction with the accompanying drawings, wherein.

DETAILED DESCRIPTION OF THE PREFERRED EMBODIMENTS

Figure 1:
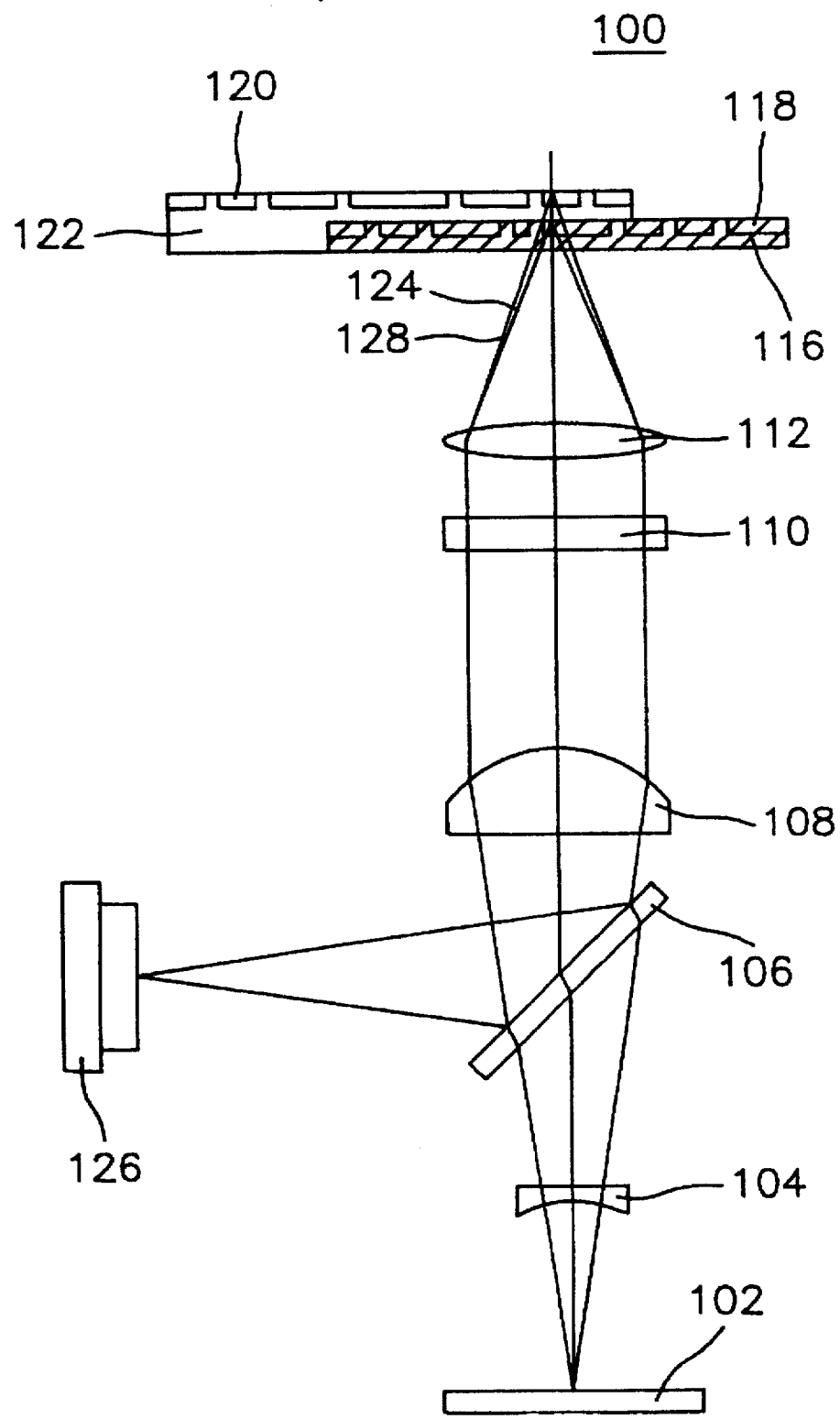
FIG. 1 represents a schematic side view of a prior art optical pickup system.
Figure 2:
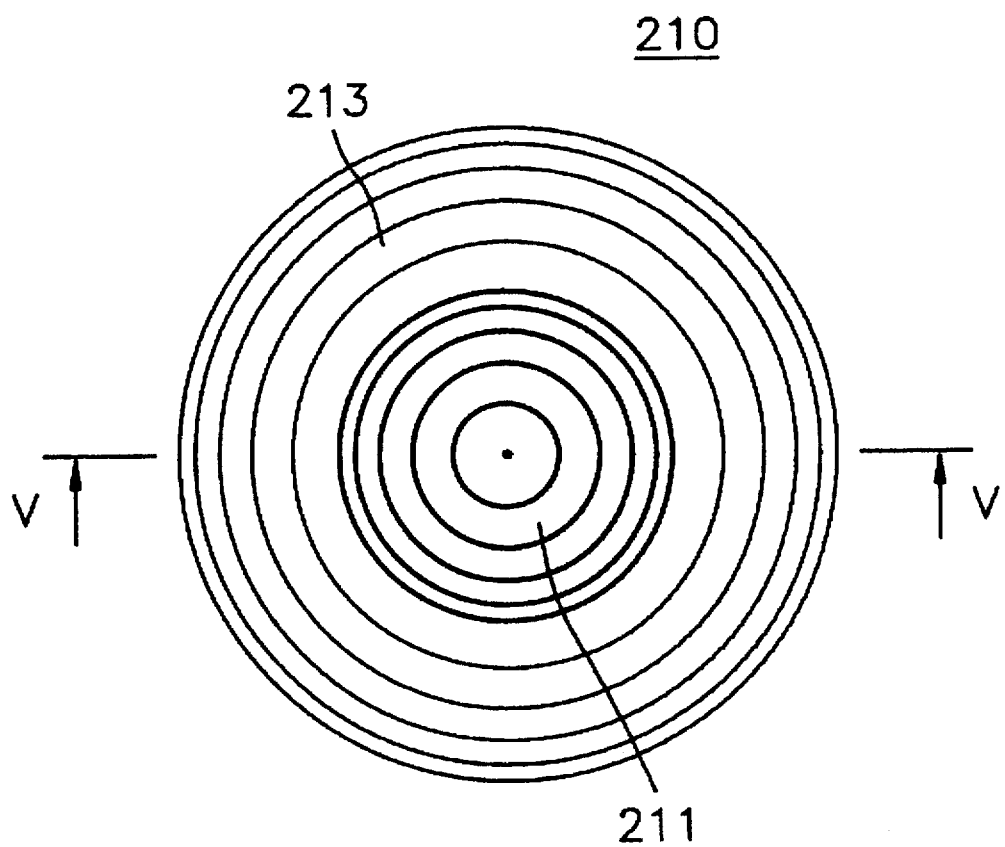
FIG. 2 shows a plan view of an optical device in accordance with the present invention.
Figure 3:
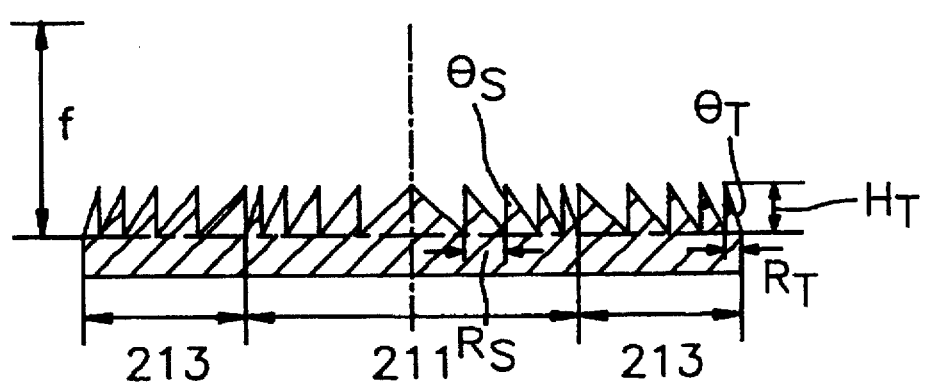
FIG. 3 presents a schematic cross-sectional view of the inventive optical device taken along the line V—V shown in FIG. 2.
Figure 4:
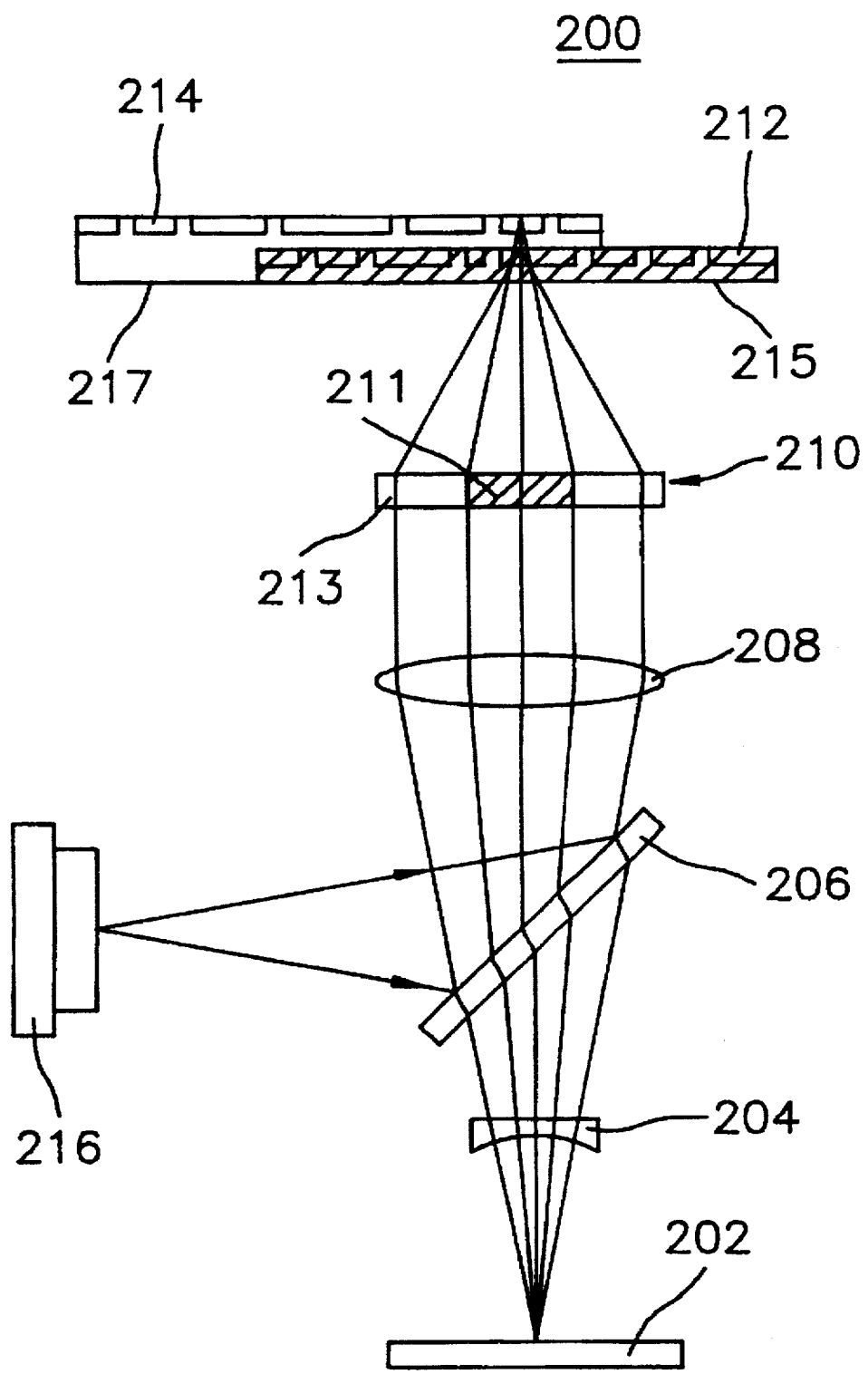
FIG. 4 depicts a schematic side view of an optical pickup system utilizing the inventive optical device.

There are illustrated in FIGS. 2 to 4 various views of the inventive optical pickup system in accordance with preferred embodiments of the present invention.

There is illustrated in FIG. 2 a plan view of an optical device 210 for use in an optical pickup system, capable of dividing a parallel light beam into a first and a second portions and focusing the first and the second portions onto a first and a second focal points, respectively. The optical device 210 comprises a base, a first and a second parts 211, 213 made of a refractive material, e.g., PMMA (Poly Methyl Meta Acryllrate), PC (Poly Carbonate) and PS (Poly Styrate). The first part 211 is indicated by a hard line. The first portion of the light beam impinges onto the first part 211 of the optical device 210 and the second portion of the parallel light beam impinges onto the second part 213 thereof.

The first part 211 includes a first annular base, made of the refractive material, having a top and a bottom surfaces parallel to each other and a first set of S triangular rings placed on top of the first annular base. Each of the triangular rings is made of the same refractive material as the first annular base and is provided with a first annular base surface having a width $R_S$, S being a natural number indicating the number of order, a first annular normal surface having a height $H_S$, the first annular base surface being perpendicular to the first annular normal surface, and a first annular inclined surface inclined at an angle $\Theta_S$ with respect to the first annular normal surface. The first set of S triangular rings is made to function as a lens having a first focal length $f_1$ by controlling the height $H_S$ and the width $R_S$.

The second part 213 of the optical device 210 includes a second annular base, made of the refractive material, having a top and a bottom surfaces parallel to each other and a second set of T triangular rings placed on top of the second annular base. Each of the triangular rings is made of the refractive material and includes a second annular base surface having a width $R_T$, T being a natural number indicating the number of order, a second annular normal surface having a height $H_T$, the second annular base surface being perpendicular to the second annular normal surface, and a second annular inclined surface inclined at an angle $\Theta_T$ with respect to the second annular normal surface. The second set of T triangular rings is made function as a lens having a focal length $f_2$, $f_2$ being smaller than $f_1$, by controlling the height $H_T$ and the width $R_T$.

As shown in FIG. 3, in case when the first annular normal surface in each of the triangular rings in the first set of triangular rings is of the same height, the first focal length $f_1$ is determined by the following equation:

$$f_1 = \frac{R_s^2 - S^2\lambda^2}{2S\lambda}$$

wherein $\lambda$ represents the wavelength of the light source and $R_S$, the width of the annular base. It is preferable that the $R_S$ in each of triangular rings increase as the ring moves closer to a center of the base.

Alternatively, the focal length $f_2$ of the second set of the T triangular rings is also determined by the same method as that of the first focal length $f_1$.

As shown in FIG. 4, the optical pickup system 200 incorporating the inventive optical device 210 includes a light source 216 for generating a light beam, a beam splitter 206 provided with a surface, a collimate lens 208, the optical device 210 having the first 211 and the second part 213, a cylindrical lens 204 and a detector 202 provided with a plurality of photoelectric cells.

In the system 200, when a thin optical disk 215 having a thickness of, e.g., 0.6 mm, is loaded on the disk tray, the light passing through the second part 213 of the optical device 210 is utilized for reproducing the information signal off the recording surface 212 of the thin optical disk 215. In this case, the light beam emitted from the light source 216, e.g., a laser diode, enters the optical device 210 via the beam splitter 206 which allows the light beam to pass partially through the surface incorporated therein and the collimate lens 208 which makes the light beam from the beam splitter 206 parallel. The surface of the beam splitter 206 is arranged in such a way that it is inclined at a predetermined angle with respect to an optical axis formed by a center point of the detector 202 and the focal point in the respective recording surface 212, 214. It is preferable that the predetermined angle be 45 degrees. In such a case the second part 213 of the optical device 210 plays the role of an object lens by focusing the parallel light beam onto the recording surface 212 of the thin optical disk 215. The light beam reflected from the recording surface 212 via the optical device 210 impinges the collimate lens 208 for converging the light beam reflected from the optical device 210 to the detector 202 via the beam splitter 206 disposed between the collimate lens 208 and the detector 202. The surface of the beam splitter 206 is capable of transmitting the light beam passing through the collimate lens 208. The collimate lens 208 is disposed between the beam splitter 206 and the optical device 210. The light beam transmitted through the beam splitter 206 impinges onto the cylindrical lens 204 to make the light beam passing therethrough astigmatic, thereby allowing the detector 202 to read the information signal, e.g., a focusing error signal, off the recording surface 212 of the thin optical disk 215 by using an astigmatic method. The cylindrical lens 204 is disposed between the beam splitter 206 and the detector 202.

Alternatively, when a thick optical disk 217 having a thickness of, e.g., 1.2 mm, is loaded on the disk tray, the light passing through the first part 211 of the optical device 210 is utilized for reproducing the information signal off the recording surface 214 of the thick optical disk 217. In this case the first part 211 of the optical device 210 plays the role of an object lens by focusing the parallel light beam passing therethrough onto the recording surface 214 of the thick optical disk 217. Therefore, it allows to the detector 202 to read the information signal off the recording surface 212 of the thick optical disk 217.

In comparison with the prior art optical head 100, the inventive optical system 200 is of a reduced size and is structurally simple, requiring a less number of components. This is achieved by incorporating therein an inventive optical device 210, thereby eliminating the objective lens 112 in the prior optical head 100, reducing the total number of components making up the system, which will, in turn, reduce the length of the optical path the light beam must travel, resulting in an overall size reduction of the system.

Even though the present invention has been described for an optical pickup system incorporating therein an optical device capable of focusing a first and a second portion of a parallel light beam onto a first and a second focal point, respectively, and hence for reading both the thin and the thick optical disks, the idea presented above can be extended to an optical pickup system for use with a number of optical disks having a different thickness by utilizing therein an optical device capable of focusing the same number of portions of the parallel light beam as that of the optical disk onto corresponding focal points, respectively.

While the present invention has been described with respect to the preferred embodiments, other modifications and variations may be made without departing from the spirit and scope of the present invention as set forth in the following claims.

What is claimed is:

1. An optical device for use in an optical pickup system, said device comprising:

a base, made of a refractive material, having a top and a flat bottom surfaces parallel to each other, wherein the top surface is divided into N number of annular regions; and N sets of M triangular rings, each of the N sets of the M triangular rings being placed on top of each of the annular regions, each of the triangular rings in each of the sets being made of the refractive material and including an annular base surface having a width $R_M$, and an annular normal surface having a height $H_M$, the annular base surface being perpendicular to the annular normal surface, wherein each of the N sets of triangular rings is made to function as a lens, each of the N sets being made to have a different focal length f by controlling the height $H_M$ and the width $R_M$ in each of the triangular rings in each of the sets, and M and N are natural numbers.

2. The optical device of claim 1, wherein the height $H_M$ of each of the triangular rings in each of the sets is approximately equal to each other.

3. The optical device of claim 2, wherein the focal length f of each of the sets is determined by the equation:

$$f = \frac{R_M^2 - M^2\lambda^2}{2M\lambda}$$

wherein $\lambda$ represents the wavelength of a light source.

4. The optical device of claim 3, wherein the $R_M$ in each of triangular rings increases as the ring moves closer to a center of the base.

5. The optical device of claim 4, wherein the refractive material is made of a poly methyl meta acryllrate (PMMA), a poly carbonate (PC) or a poly styrate (PS).

6. An optical pick-up system for reproducing information signals stored on a number of optical disks loaded on a disk tray, wherein each of the optical disks has a respective recording surface, said system comprising:

means for generating a parallel light beam; and an optical device provided with a plurality of parts, wherein each of the parts having a different focal length is capable of dividing the parallel light beam into the same number of portions as that of the optical disks and focusing each portion of the parallel light beams onto the recording surface of a corresponding optical disk, respectively, to thereby allow the optical pickup system to read the information signals off the recording surface of the corresponding optical disk.

7. The optical pickup system of claim 6 further includes detecting means.

8. The optical pickup system of claim 7, wherein the parallel light beam generating means includes:

a light source for generating a light beam;

beam splitting means for reflecting the light beam to the respective recording surface, and transmitting the light beam reflected from the recording surfaces to the detecting means; and means for collimating the light beam reflected from the beam splitting means to thereby generate the parallel light beam.

9. The optical pickup system of claim 8, wherein the collimating means also converges the light beams reflected from the optical disks.

10. The optical pickup system of claim 9, wherein the collimating means is disposed between the detecting means and the optical device.

11. The optical pickup system of claim 10, wherein the beam splitting means is disposed between the collimating means and the detecting means.

12. The optical pickup system of claim 11, wherein the beam splitting means is arranged in such a way that it is inclined at a predetermined angle with respect to an optical axis formed by a center point of the detecting means and a convergence point in the respective recording surface.

13. The optical pickup system of claim 8, wherein the optical device includes:

a base, made of a refractive material, having a top and a flat bottom surfaces parallel to each other, wherein the top surface is divided into N number of annular regions;

N sets of M triangular rings, each of the N sets of the M triangular rings being placed on top of each of the annular regions, each of the triangular rings in each of the sets being made of the refractive material and including an annular base surface having a width $R_M$, and an annular normal surface having a height $H_M$, the annular base surface being perpendicular to the annular normal surface, wherein each of the N sets of triangular rings is made to function as a lens, each of the N sets being made to have a different focal length f by controlling the height $H_M$ and the width $R_M$ in each of the triangular rings in each of the sets, and M and N are natural numbers.

14. The optical pickup system of claim 8, wherein the beam splitting means is capable of partially reflecting the light beam from the light source to the optical disks and partially transmitting the light beam transmitted through the optical device to the detecting means.

15. An optical pickup system for reproducing information signals stored on a first and a second optical disk loaded on a disk tray, wherein each of the optical disks having a recording surface is of a different thickness, said system comprising:

means for generating a parallel light beam;

an optical device provided with a first and a second parts, wherein a portion of the parallel light beam impinging onto the first part is focused onto the first optical disk, and the remaining portion of the parallel light beam impinging onto the second part is focused onto the second optical disk, thereby allowing the optical pickup system to read the information signals off the respective recording surface, alternately; and detecting means for reading the information signal off the respective optical disk.

16. The optical pickup system of claim 15, wherein the parallel light beam generating means includes:

a light source for generating a light beam;

beam splitting means for reflecting the light beam to the recording surfaces, and transmitting the light beam reflected from the recording surfaces to the detecting means; and means for collimating the light beam reflected from the beam splitting means to thereby generate the parallel light beam.

17. The optical pickup system of claim 16, wherein the collimating means also converges the light beams reflected from the optical disks.

18. The optical pickup system of claim 16, wherein the first optical disk has a thickness of 0.6 mm.

19. The optical pickup system of claim 16, wherein the second optical disk has a thickness of 1.2 mm.

20. The optical pickup system of claim 16, wherein the first part of the optical device includes:

a first annular base, made of a refractive material, having a top and a bottom surfaces parallel to each other; and a first set of T triangular rings placed on top of the first annular base, each triangular ring being made of the refractive material and having a first annular base surface having a width $R_T$, a first annular normal surface having a height $H_T$, the first annular base surface being perpendicular to the first annular normal surface, wherein the first set of T triangular rings serve as a lens which may have a first focal length $f_1$, wherein the first focal length $f_1$ is controlled by changing the height $H_T$ and the width $R_T$.

21. The optical pickup system of claim 20, wherein the second part of the optical device includes:

a second annular base, made of a refractive material, having a top and a bottom surfaces parallel to each other; and a second set of S triangular rings placed on top of the second annular base, each of the triangular rings being made of the refractive material and having a second base surface having a width $R_S$, and a second normal surface having a height $H_S$, the second base surface being perpendicular to the second normal surface, wherein the second set of S triangular rings serve as a lens which may have a second focal length $f_2$, wherein the second focal length $f_2$ is controlled by changing the height $H_S$ and the width $R_S$.

22. The optical pickup system of claim 21, wherein the second focal length $f_2$ is smaller than the first focal length $f_1$.

* * * * *